United States Patent
Anderson

(10) Patent No.: US 9,201,252 B2
(45) Date of Patent: Dec. 1, 2015

(54) CLEANING TOOL

(71) Applicant: Wayne Lee Anderson, Kent, WA (US)

(72) Inventor: Wayne Lee Anderson, Kent, WA (US)

(*) Notice: Subject to any disclaimer, the term of this patent is extended or adjusted under 35 U.S.C. 154(b) by 0 days.

(21) Appl. No.: 14/520,077

(22) Filed: Oct. 21, 2014

(65) Prior Publication Data

US 2015/0113751 A1   Apr. 30, 2015

Related U.S. Application Data

(60) Provisional application No. 61/897,427, filed on Oct. 30, 2013.

(51) Int. Cl.
*G02C 13/00* (2006.01)
*A47L 4/02* (2006.01)

(52) U.S. Cl.
CPC .............. *G02C 13/006* (2013.01); *G02C 13/00* (2013.01); *A47L 4/02* (2013.01)

(58) Field of Classification Search
CPC ......... G02C 13/00; G02C 13/006; A47L 4/02
USPC ........ 15/208, 209.1, 210.1, 214, 218, 104.94, 15/220.2; 401/9, 10
See application file for complete search history.

(56) References Cited

U.S. PATENT DOCUMENTS

| | | | | |
|---|---|---|---|---|
| 2,507,559 A | | 5/1950 | D'Andrea | |
| 2,723,412 A | * | 11/1955 | Harris | 15/220.3 |
| 2,880,441 A | * | 4/1959 | Rushing, Jr. | 15/214 |
| 3,643,279 A | * | 2/1972 | De Bruhl | 15/104.94 |
| 4,480,352 A | * | 11/1984 | Eggett | 15/214 |
| 4,546,517 A | * | 10/1985 | Caniglia | 15/214 |
| 5,000,204 A | | 3/1991 | Smith | |
| 5,457,842 A | * | 10/1995 | Chang | 15/214 |
| 5,791,211 A | * | 8/1998 | Bondhus et al. | 81/440 |
| 6,138,312 A | * | 10/2000 | Cummings | 15/104.92 |
| 6,339,860 B1 | * | 1/2002 | Chen | 15/214 |
| 7,022,187 B2 | * | 4/2006 | Stockton | 118/504 |
| 7,350,994 B2 | * | 4/2008 | Meert | 401/10 |
| 2007/0039115 A1 | * | 2/2007 | Stefel | 15/214 |
| 2008/0196189 A1 | * | 8/2008 | Kam | 15/214 |
| 2008/0256735 A1 | | 10/2008 | Campbell | |
| 2012/0074635 A1 | * | 3/2012 | Vasis et al. | 269/293 |
| 2013/0060380 A1 | | 3/2013 | Ryu et al. | |

FOREIGN PATENT DOCUMENTS

| | | | |
|---|---|---|---|
| CA | WO2012/021962 | * | 2/2012 |
| WO | 2012021962 A1 | | 2/2012 |

* cited by examiner

*Primary Examiner* — Monica Carter
*Assistant Examiner* — Michael Jennings
(74) *Attorney, Agent, or Firm* — Plager Schack LLP

(57) ABSTRACT

A cleaning tool is configured to remove debris from a glass surface. The cleaning tool includes an upper arm mechanically coupled to an upper pad. A lower arm is rotationally coupled to the upper arm and mechanically coupled to a lower pad. The upper pad and the lower pad are configured to clean both sides of the glass surface at once.

5 Claims, 3 Drawing Sheets

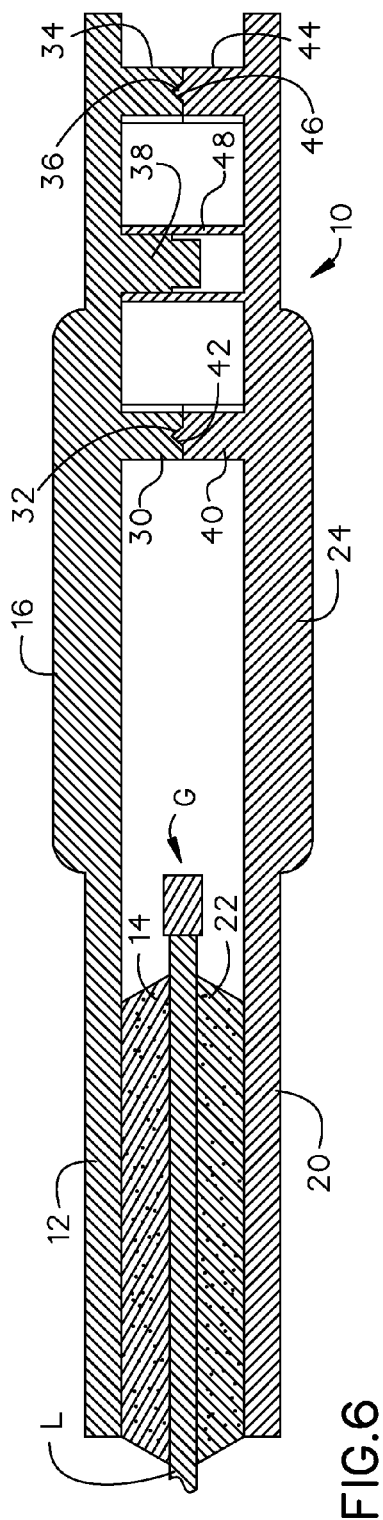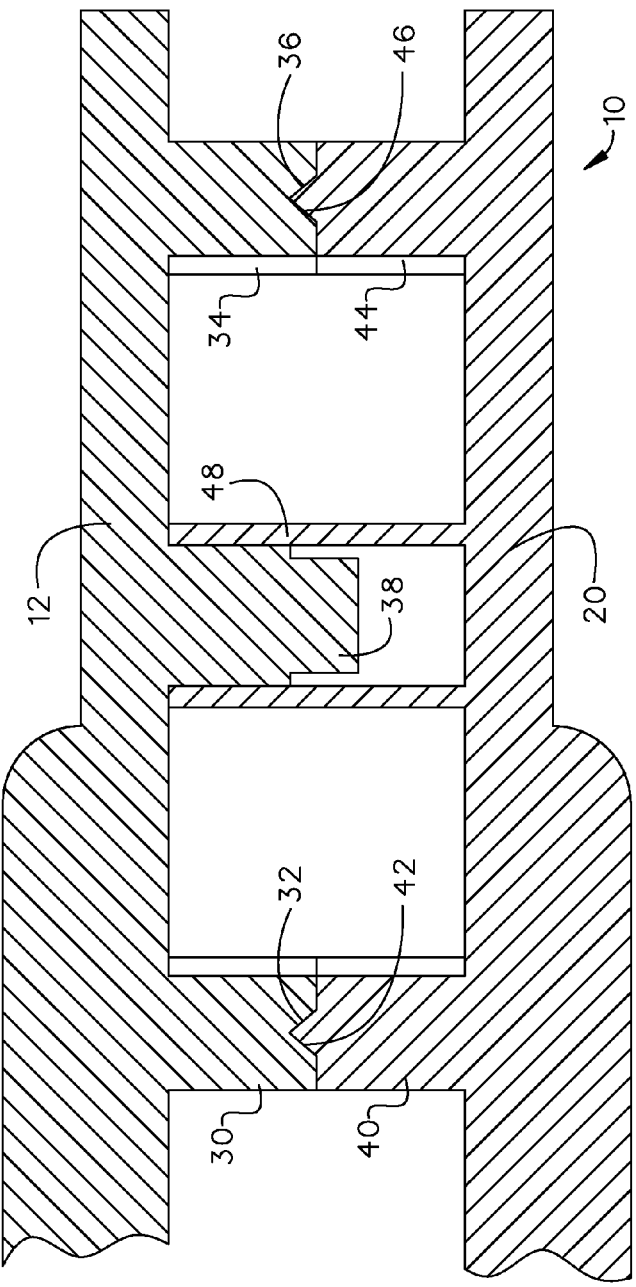
FIG.6
FIG.7

CLEANING TOOL

RELATED APPLICATION

This application claims priority to provisional patent application U.S. Ser. No. 61/897,427 filed on Oct. 30, 2014, the entire contents of which is herein incorporated by reference.

BACKGROUND

The embodiments herein relate generally to devices that can be used to clean glass.

Prior to embodiments of the disclosed invention, oil, smudges, grease or other film could not be removed from class without a liquid or cleaning solution. Embodiments of the disclosed invention solve this problem.

SUMMARY

A cleaning tool is configured to remove debris from a glass surface. The cleaning tool includes an upper arm mechanically coupled to an upper pad. A lower arm is rotationally coupled to the upper arm and mechanically coupled to a lower pad. The upper pad and the lower pad are configured to clean both sides of the glass surface at once.

In some embodiments, finger ridges mechanically are coupled to the upper arm to enable holding the cleaning tool and to increase structural strength of the cleaning tool. In some embodiments, a king pin hinge rotationally couples the upper arm to the lower arm.

In some embodiments, the upper pad and the lower pad are made from foam covered in microfiber such that the microfiber extends outside of the upper arm and the lower arm in order to better clean nose pieces on glasses. In some embodiments, the upper pad and the lower pad are made from foam covered in suede such that the suede extends outside of the upper arm and the lower arm in order to better clean nose pieces on glasses.

In some embodiments, the upper arm and the lower arm are made from made from a compound including acrylonitrile butadiene styrene and 30% glass to increase strength and prevent plastic deformation.

BRIEF DESCRIPTION OF THE FIGURES

The detailed description of some embodiments of the invention is made below with reference to the accompanying figures, wherein like numerals represent corresponding parts of the figures.

FIG. 6 is a section view of an embodiment of the invention along line 6-6 in FIG. 1.

FIG. 7 is a section detail view of an embodiment of the invention.

DETAILED DESCRIPTION OF CERTAIN EMBODIMENTS

Figure 1:
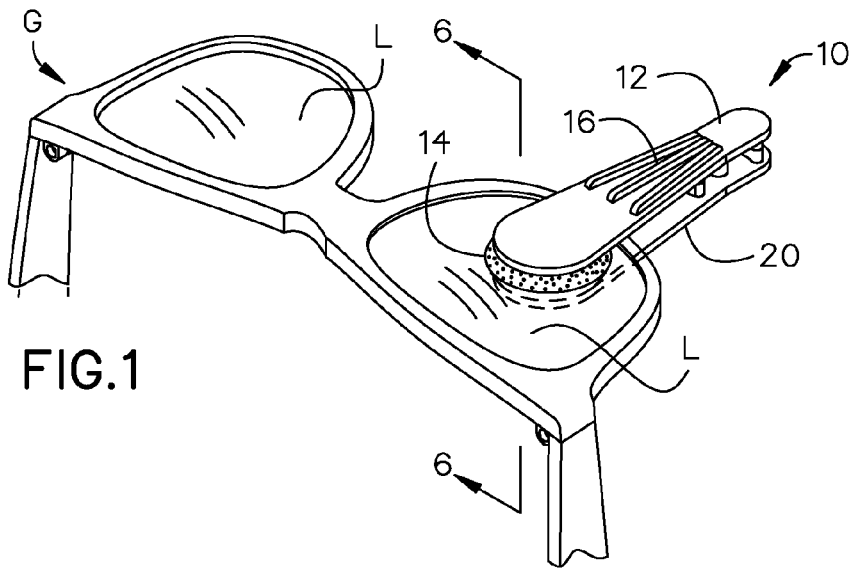
FIG. 1 is a perspective view of an embodiment of the invention shown in use.
Figure 2:
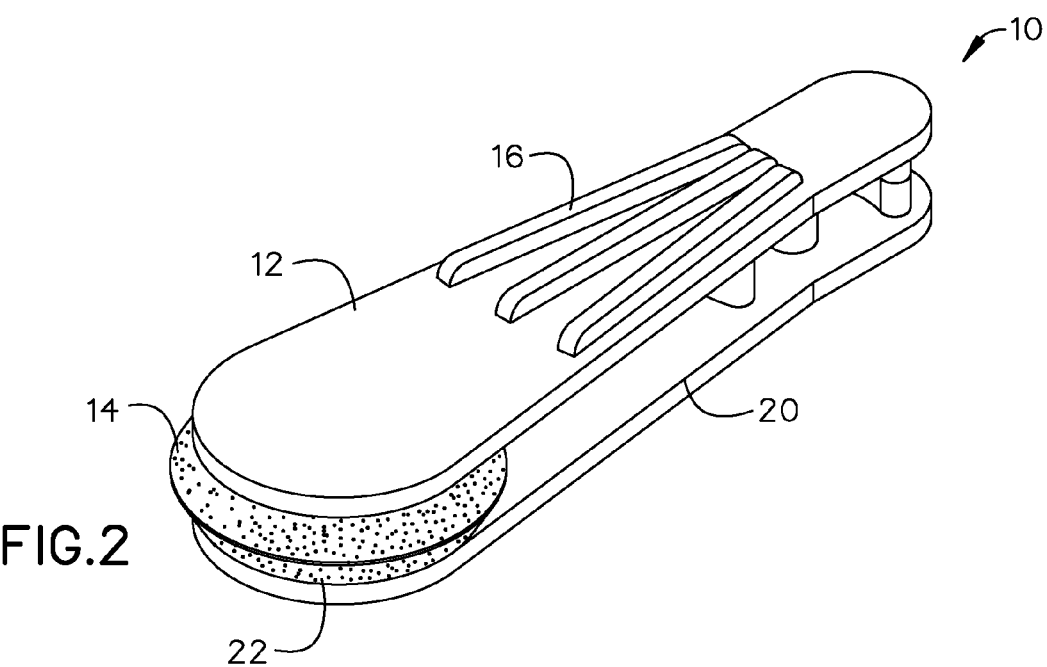
FIG. 2 is a perspective view of an embodiment of the invention.
Figure 3:
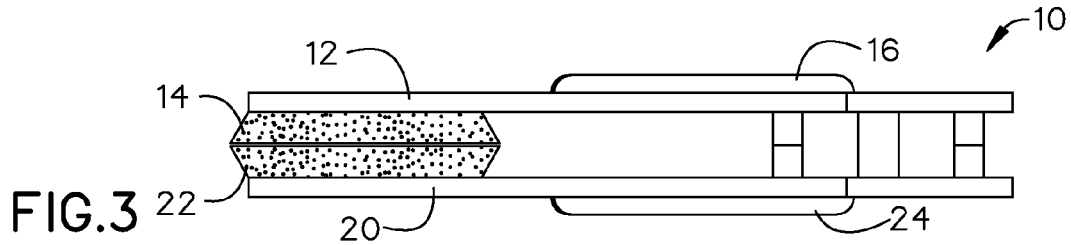
FIG. 3 is a side view of an embodiment of the invention.
Figure 4:
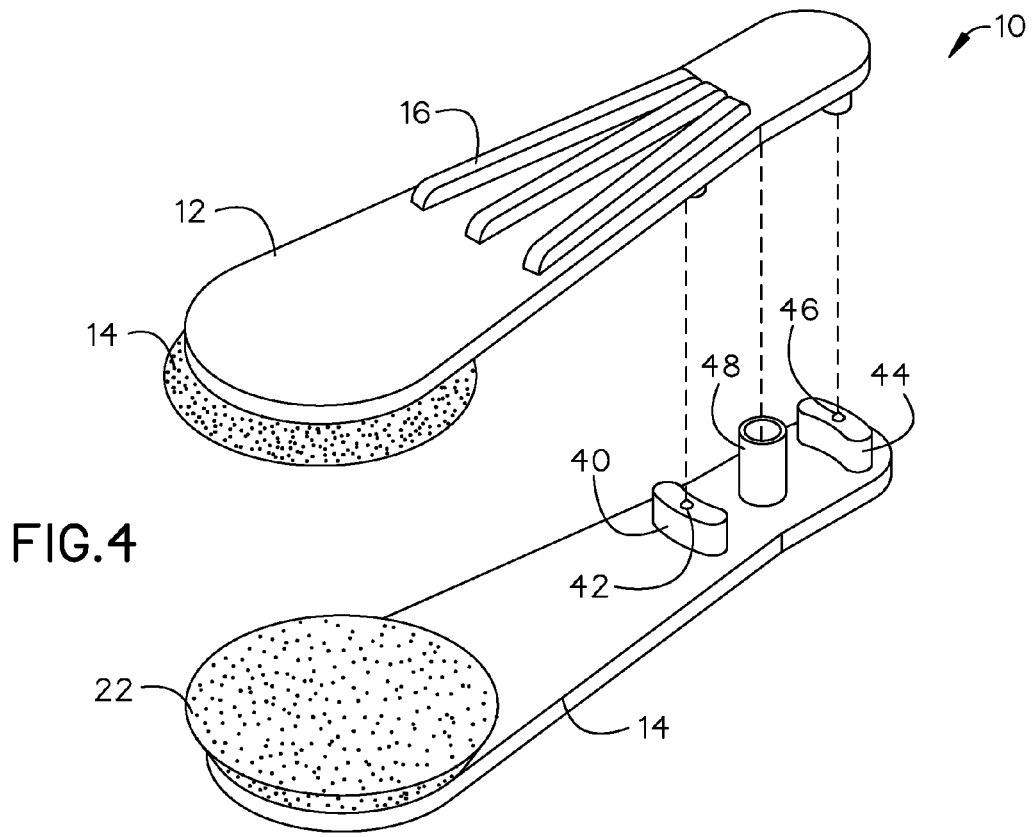
FIG. 4 is an exploded view of an embodiment of the invention.
Figure 5:
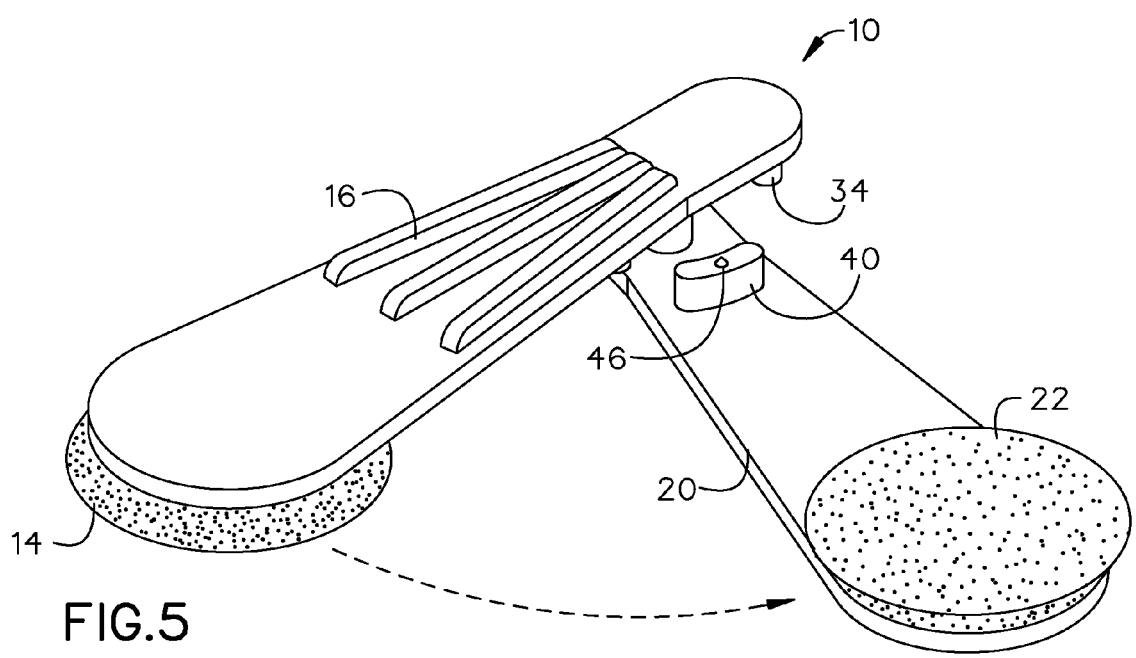
FIG. 5 is a perspective view of an embodiment of the invention demonstrating swivel feature.

By way of example, and referring to FIG. 1, a user desires to surface L on system G, cleaning tool 10 is effective for this.

In this embodiment, system G is glasses and surface L is a lens. However, cleaning tool 10 can be used on any glass services including cellular phone glass. Cleaning tool 10 comprises upper arm 12 mechanically coupled to upper pad 14. Upper arm 12 is further mechanically coupled to finger ridges 16. In some embodiments, upper arm 12 and lower arm 20 are more than 3.5 inches long and in some embodiments, 3 9/16 inches long in order that a user can hold upper arm 12 by finger ridges 16 in order to permit greater depth over larger lenses of some new glasses, sunglasses, protective eyewear, ski goggles, and others. In some embodiments, finger ridges 16 are at least ¼ inch and in some embodiments 3/16 inch for more strength and stability of flex in upper arm 12.

Turning to FIG. 2, FIG. 3, FIG. 4 and FIG. 5 in some embodiments upper arm 12 is rotationally coupled to lower arm 20. Lower arm 20 is mechanically coupled to lower pad 22 and lower finger ridges 24. In some embodiments, upper arm 12 and lower arm 20 can be made from a compound including acrylonitrile butadiene styrene and 30% glass. The unique glass addition, increases strength, bending and flex without plastic deformation. This also ensures that upper pad 14 and lower pad 20 fit immediately adjacent to one another in a closed position in order to the possibility for any dirt, dusts, or foreign particles getting on the pads cleaning surfaces. In some embodiments upper arm 12 and lower arm 20 comprise rounded edges in order to prevents scratching surface L when being used for cleaning.

Both upper pad 14 and lower pad 22 comprise a circular contact area that flares outward and outside upper arm 12 or lower arm 20. In some embodiments, upper pad 14 and lower pad 22 are made from foam covered with either a micro fiber cleaning cloth or a suede cleaning cloth. This enables cleaning close to a nose support on eye glasses, deep framed lens holders, deep recesses of binoculars and telescopes and other goggle devices. Further, both sides of a piece of glass can be cleaned at the same time. The foam can be an open cell foam with a density that permits a certain stability at compression to supply adequate pressure but not too much so as not to pull the lenses out of the frames they are in or to break the lens when applying pressure to them. In some embodiments, upper pad 14 and lower pad 22 can comprise a large rectangular foam surface and the increase in size to help cleaning tool 10 clean larger flat surfaces.

As shown in FIG. 6 and FIG. 7, upper arm 12 is mechanically coupled to first outer upper post 30 further comprising first outer upper post protrusion 32. Upper arm 12 is further mechanically coupled to second outer upper post 34 further comprising second outer upper post protrusion 36. Upper arm 12 is further mechanically coupled to male center post 38.

Lower arm 20 is mechanically coupled to first outer lower post 40 further comprise first outer lower post indent 42. Upper arm 12 is further mechanically coupled to second outer lower post 44 further comprising second outer lower post protrusion 46. Lower arm 20 is further mechanically coupled to female center post 48.

A user can rotate lower arm 14 parallel to upper arm 12 in order to align first outer upper post protrusion 32 with first outer lower post indent 42. Likewise, male center post 38 provides a rotational couple with female center post 48 forming a releasing king pin hinge. Finally, second outer upper post protrusion 36 is aligned with first outer lower post indent 46. In some embodiments, male center post 38 and female center post 48 are configured to be at least ½ inch apart and preferably ⅝ inch apart in order to allow great ease and access over thicker frames of eye wear and the ability to clean flat surfaces with its unique swiveling open ability and releasing king ping hinge. The releasing king pin hinge permits a closed formation and an open formation as cleaning is sometimes easier in one configuration than another. In the closed formation, cleaning tool 10 can be carried in ones' pocket, purse or key chain without its pads coming in contact with foreign particles that could damage lenses.

In some embodiments, a hole can be bored into either upper arm 12 or lower arm 20 for the attachment of a chain so as to be used as a key chain. In some embodiments, a flat smooth surface can be present on either upper arm 12 or lower arm 20 for the use of labels, silk screening and or embossing a company name for the purpose of advertising. The expansionary shape of upper arm 12 or lower arm 20 also enables applying pressure uniformly over the surfaces being cleaned and the addition of glass to the ABS plastic and 1/16 inch ribs on the backs of the support arms give it an even and constant application of pressure on the lenses at the same time.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A cleaning tool, configured to remove debris from a glass surface; the cleaning tool comprising:
    an upper arm mechanically coupled to an upper pad;
    a lower arm, rotationally coupled to the upper arm and mechanically coupled to a lower pad;
    a king pin hinge that rotationally couples the upper arm to the lower arm, and further comprising:
        a first outer upper post, attached to the upper arm and further comprising a first outer upper post protrusion;
        a second outer upper post, attached to the upper arm and further comprising a second upper post protrusion;
        a first outer lower post, attached to the lower arm and further comprising a first outer lower post indent;
        a second outer lower post, attached to the lower arm and further comprising a second lower post indent;
        the first outer upper post is configured to mate with the first outer lower post in a first mode of operation and mate with the second outer lower post in a second mode of operation;
        while the second outer upper post is configured to mate with the second outer lower post in the first mode of operation and mate with the first outer lower post in the second mode of operation;
    wherein the upper pad and the lower pad are configured to clean both sides of the glass surface at once.

2. The cleaning tool of claim 1, further comprising finger ridges mechanically coupled to the upper arm to enable holding the cleaning tool and to increase structural strength of the cleaning tool.

3. The cleaning tool of claim 1, wherein the upper pad and the lower pad are made from foam covered in microfiber such that the microfiber extends outside of the upper arm and the lower arm in order to better clean nose pieces on glasses.

4. The cleaning tool of claim 1, wherein the upper pad and the lower pad are made from foam covered in suede such that the suede extends outside of the upper arm and the lower arm in order to better clean nose pieces on glasses.

5. The cleaning tool of claim 1 wherein the upper arm and the lower arm are made from made from a compound including acrylonitrile butadiene styrene and 30% glass to increase strength and prevent plastic deformation.

* * * * *